United States Patent
Osawa et al.

(10) Patent No.: US 10,896,142 B2
(45) Date of Patent: Jan. 19, 2021

(54) NON-VOLATILE MEMORY OUT-OF-BAND MANAGEMENT INTERFACE FOR ALL HOST PROCESSOR POWER STATES

(71) Applicant: Intel Corporation, Santa Clara, CA (US)

(72) Inventors: Daniel Osawa, Tigard, OR (US); Kelly Couch, Beaverton, OR (US); Maciej Plucinski, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/370,494

(22) Filed: Mar. 29, 2019

(65) Prior Publication Data
US 2019/0227961 A1   Jul. 25, 2019

(51) Int. Cl.
*G06F 13/16* (2006.01)
*G06F 3/06* (2006.01)

(52) U.S. Cl.
CPC ........ *G06F 13/1668* (2013.01); *G06F 3/0604* (2013.01); *G06F 3/0632* (2013.01); *G06F 3/0659* (2013.01); *G06F 3/0679* (2013.01)

(58) Field of Classification Search
CPC .. G06F 13/1668; G06F 3/0679; G06F 3/0604; G06F 3/0632; G06F 3/0659; G06F 2212/7207; G06F 12/0246
See application file for complete search history.

(56) References Cited

U.S. PATENT DOCUMENTS

| | | | |
|---|---|---|---|
| 6,976,145 B1* | 12/2005 | Bradford | G06F 11/1662 711/1 |
| 8,078,873 B2 | 12/2011 | Shah et al. | |
| 8,145,894 B1* | 3/2012 | Casselman | G06F 15/7871 713/1 |
| 8,473,717 B2* | 6/2013 | Hugosson | G06F 12/08 712/34 |
| 9,182,808 B1* | 11/2015 | Jones | G06F 1/3287 |
| 9,772,912 B2 | 9/2017 | Richardson et al. | |
| 2006/0079999 A1* | 4/2006 | Husein | H04L 41/00 700/275 |
| 2006/0242280 A1* | 10/2006 | Zimmer | G06F 8/60 709/222 |
| 2009/0299923 A1* | 12/2009 | Fletcher | G06Q 10/06 706/11 |

(Continued)

OTHER PUBLICATIONS

Blevin et al., Designing Systems Without a Suspend Supply, Intel Manual, Dec. 2008, 13 pages, Intel Corporation.

(Continued)

*Primary Examiner* — Farley Abad
(74) *Attorney, Agent, or Firm* — Jordan IP Law, LLC

(57) ABSTRACT

Systems, apparatuses and methods may provide for technology that receives, at a remote access controller of a computing system, configuration data associated with a non-volatile memory of the computing system, wherein the configuration data is received while the computing system is in a sleep state. The technology may also store the configuration data and provide a host processor of the computing system with access to the configuration data. In one example, receipt of the configuration data bypasses a memory configuration-related reboot of the computing system and the configuration data is received via an out-of-band management interface.

9 Claims, 5 Drawing Sheets

(56) References Cited

U.S. PATENT DOCUMENTS

| | | | |
|---|---|---|---|
| 2010/0070642 A1* | 3/2010 | Bansal | H04L 67/2861 709/230 |
| 2011/0085501 A1* | 4/2011 | Page | H04W 24/02 370/329 |
| 2013/0229205 A1* | 9/2013 | Yoneda | H03K 19/173 326/39 |
| 2016/0179375 A1* | 6/2016 | Kirvan | G06F 12/0246 711/153 |

OTHER PUBLICATIONS

Intel et al., Intelligent Platform Management Interface Specification Second Generation, Oct. 1, 2013, 644 Pages, vol. Two, Intel Corporation, Hewlett-Packard Company, NEC Corporation, Dell Inc.

Autor et al., Redfish Host Interface Specification, Dec. 11, 2017, 19 pages, Version 1.0.1, Distributed Management Task Force, Inc.

* cited by examiner

NON-VOLATILE MEMORY OUT-OF-BAND MANAGEMENT INTERFACE FOR ALL HOST PROCESSOR POWER STATES

TECHNICAL FIELD

Embodiments generally relate to memory management interfaces. More particularly, embodiments relate to non-volatile memory (NVM) out-of-band management interfaces for all host processor power states.

BACKGROUND

Datacenters may use large arrays of Non-Volatile Memory Express (NVMe) devices to store data. Conventional approaches to configuring the NVMe devices for operation may adhere to a policy of only configuring an NVMe device while the computing system/platform containing the NVMe device is in an operational power state (e.g., S0 power state of the Advanced Configuration and Power Interface/ACPI Specification, Rev. 6.2, May 2017). The operational power state supports a run-time environment that facilitates the execution of precompiled binaries such as, for example, LINUX and/or WINDOWS, as well as a UEFI (Unified Extensible Firmware Interface) shell. In such a case, a system administrator may typically boot the system to activate the operating system (OS), log in remotely, set the proper memory configuration (e.g., using a command line interface/CLI, graphical user interface/GUI and/or human interface infrastructure/HII), and reboot the system. Due to the involvement of multiple boot sequences, conventional approaches to configuring NVMe devices may be slow and inflexible.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
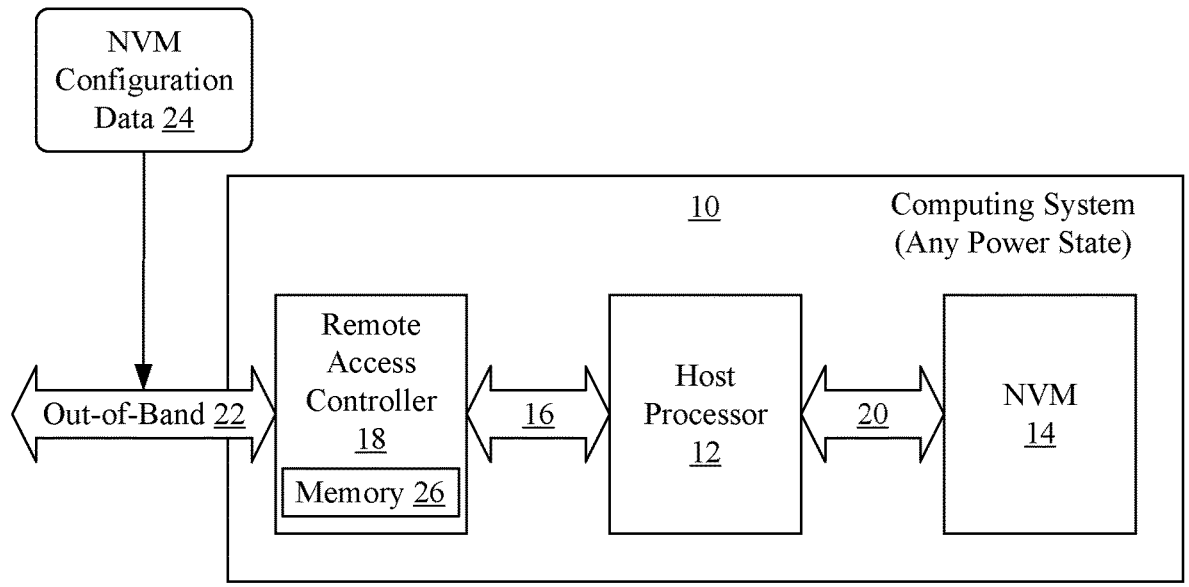
FIG. 1 is a block diagram of an example of a computing system that accepts non-volatile memory (NVM) configuration data while in any power state according to an embodiment.

Turning now to FIG. 1, a performance-enhanced computing system 10 is shown in which a host processor 12 (e.g., central processing unit/CPU) is communicatively coupled to a non-volatile memory (NVM, e.g., including one or more dual inline memory modules/DIMMs) 14 via an interface 16 such as, for example, a Double Data Rate Transport (DDRT) interface. The illustrated computing system 10, which may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), gaming functionality (e.g., networked multi-player console), etc., or any combination thereof, also includes a remote access controller 18 (e.g., baseboard management controller/BMC, integrated DELL remote access controller/iDRAC, etc.).

In an embodiment, the remote access controller 18 is communicatively coupled to the host processor 12 via an interface 20 such as, for example, a direct memory access (DMA) interface. In one example, the remote access controller 18 measures internal physical variables of the computing system 10 such as, for example, temperature, humidity, power-supply voltage, fan speeds, communications parameters, and operating system (OS) functions. The illustrated remote access controller 18 includes a memory 26 (e.g., shared memory) to store the measured data as well as firmware instructions to operate the remote access controller 18. System administrators may generally gain access to the data collected by the remote access controller 18 via an out-of-band (OOB) interface 22 (e.g., Intelligent Platform Management Interface/IPMI, Redfish Host Interface, etc.) of the computing system 10. In one embodiment, the OOB interface 22 is separate from a primary networking connection (e.g., wired, wireless, not shown) of the computing system 10. In another embodiment, the OOB interface 22 is not separate from the primary networking connection.

The illustrated remote access controller 18 also receives (e.g., from a system administrator) configuration data 24 associated with the NVM 14 via the OOB interface 22. The configuration data 24 may generally describe how data is to be stored in the NVM 14. For example, the configuration data 24 might identify volume partitioning of the NVM 14 in a datacenter setting. The illustrated remote access controller 18 stores the configuration data 24 in the memory 26, marks the configuration data 24 as not yet applied, and provides the host processor 12 with access (e.g., read/write access) to the configuration data 24. In one example, the host processor 12 maps the memory 26 to a memory space managed by the host processor 12, wherein boot code such as, for example, BIOS (basic input/output system), Extensible Firmware Interface (EFI) and/or UEFI firmware instructions, executing on the host processor 12 checks for newly stored NVM configurations on every boot. When the configuration data 24 is encountered by the BIOS, the BIOS may apply the configuration data 24 to the NVM 14 and mark the configuration data 24 in the memory 26 as applied.

Of particular note is that the illustrated configuration data 24 is received by the remote access controller 18 while the computing system 10 is in any power state. For example, the remote access controller 18 may receive and/or accept the configuration data 24 while the computing system 10 is in a sleep state (e.g., S1-S4 ACPI power states). Accepting the configuration data 24 while the computing system 10 and/or host processor 12 are in a sleep state enables a boot or reboot of the computing system 10 to be avoided. For example, a system administrator no longer needs to reboot the system 10 to activate the OS in the host processor 12, log in remotely, and set the proper memory configuration (e.g., using a CLI, GUI and/or HII), in the illustrated example.

Accordingly, the computing system 10 may be considered to be performance-enhanced and/or scalability-enhanced to the extent that configuring the NVM 14 is faster and more flexible than conventional solutions.

Figure 2:
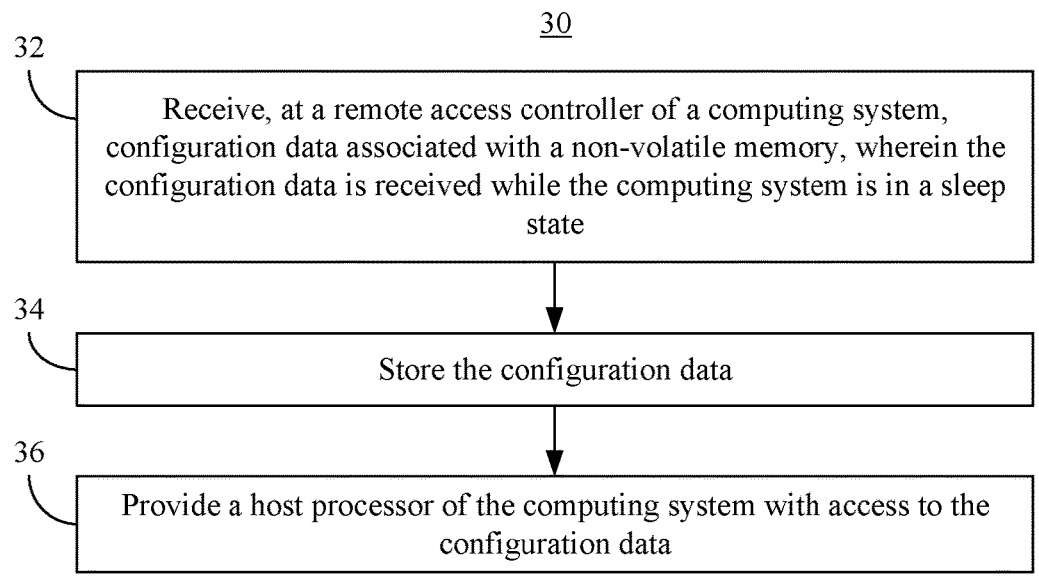
FIG. 2 is a flowchart of an example of a method of operating a remote access controller according to an embodiment.

FIG. 2 shows a method 30 of operating a remote access controller such as, for example, the remote access controller 18 (FIG. 1), already discussed. The method 30 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 30 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 32 receives, at a remote access controller of a computing system, configuration data associated with an NVM, wherein the configuration data is received while the computing system is in a sleep state. In an embodiment, block 32 bypasses a memory configuration-related reboot of the computing system. The configuration data may be received via an OOB management interface. In one example, block 32 also includes verifying the configuration data (e.g., confirming that the configuration data is supported by the target run-time environment). The configuration data is stored to a memory (e.g., shared memory) at block 34. Block 34 may also include marking the configuration data as not yet applied. Illustrated block 36 provides a host processor of the computing system with access to the configuration data. In an embodiment, block 36 includes granting read/write access to the memory that stores the configuration data.

As already noted, accepting the configuration data while the computing system is in the sleep state enables a reboot of the computing system to be avoided. Thus, a system administrator no longer needs to reboot the system to activate the OS on the host processor, log in remotely, and set the proper memory configuration, in the illustrated example. Accordingly, the method 30 may enhance performance and scalability to the extent that configuring the NVM is faster and more flexible than conventional solutions.

Figure 3A:
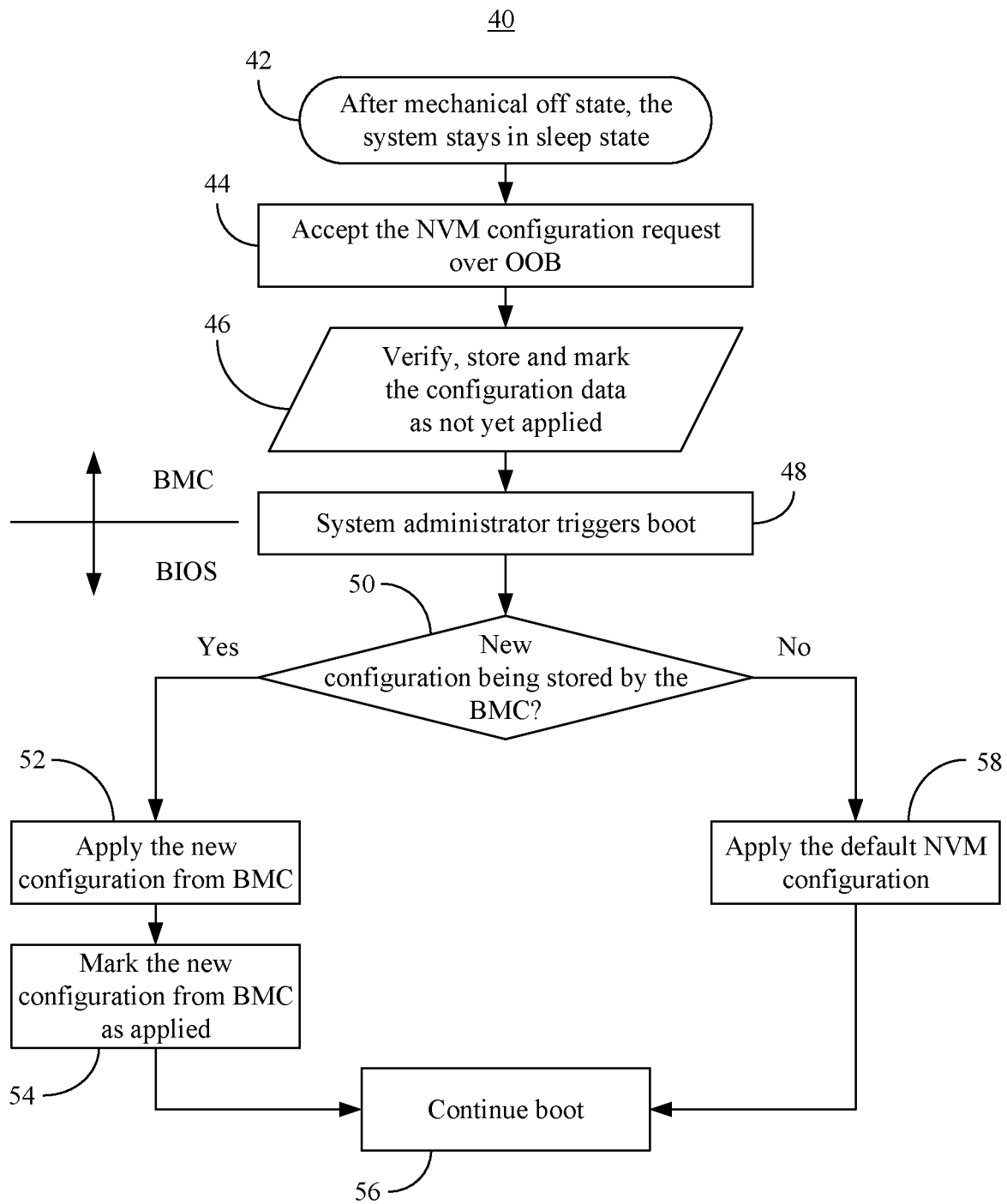
FIG. 3A is a flowchart of an example of an initial boot configuration flow according to an embodiment.

FIG. 3A shows a method 40 of conducting an initial boot configuration. The method 40 may generally be implemented in a remote access controller such as, for example, a BMC, and boot code such as, for example, BIOS of a computing system such as the computing system 10 (FIG. 1), already discussed. More particularly, the method 40 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated BMC block 42 maintains the computing system in a sleep state (e.g., S1-S4 ACPI power states) after a mechanical off state (e.g., G3 ACPI power state). An NVM configuration request may be accepted over an OOB management interface at BMC block 44. BMC block 46 verifies, stores and marks the configuration data as not yet applied. A system administrator may trigger a boot of the computing system at block 48, wherein illustrated BIOS block 50 determines whether a new configuration is being stored by the BMC. If so, BIOS block 52 retrieves and applies the new configuration from the BMC and BIOS block 54 marks the new configuration from the BMC as applied. The boot may be continued at BIOS block 56. If it is determined at BIOS block 50 that there is no new configuration being stored by the BMC, illustrated BIOS block 58 applies a default NVM configuration. The illustrated method 40 therefore enables faster configuration of the NVM by accepting the NVM configuration request while the computing system is in the sleep state.

Figure 3B:
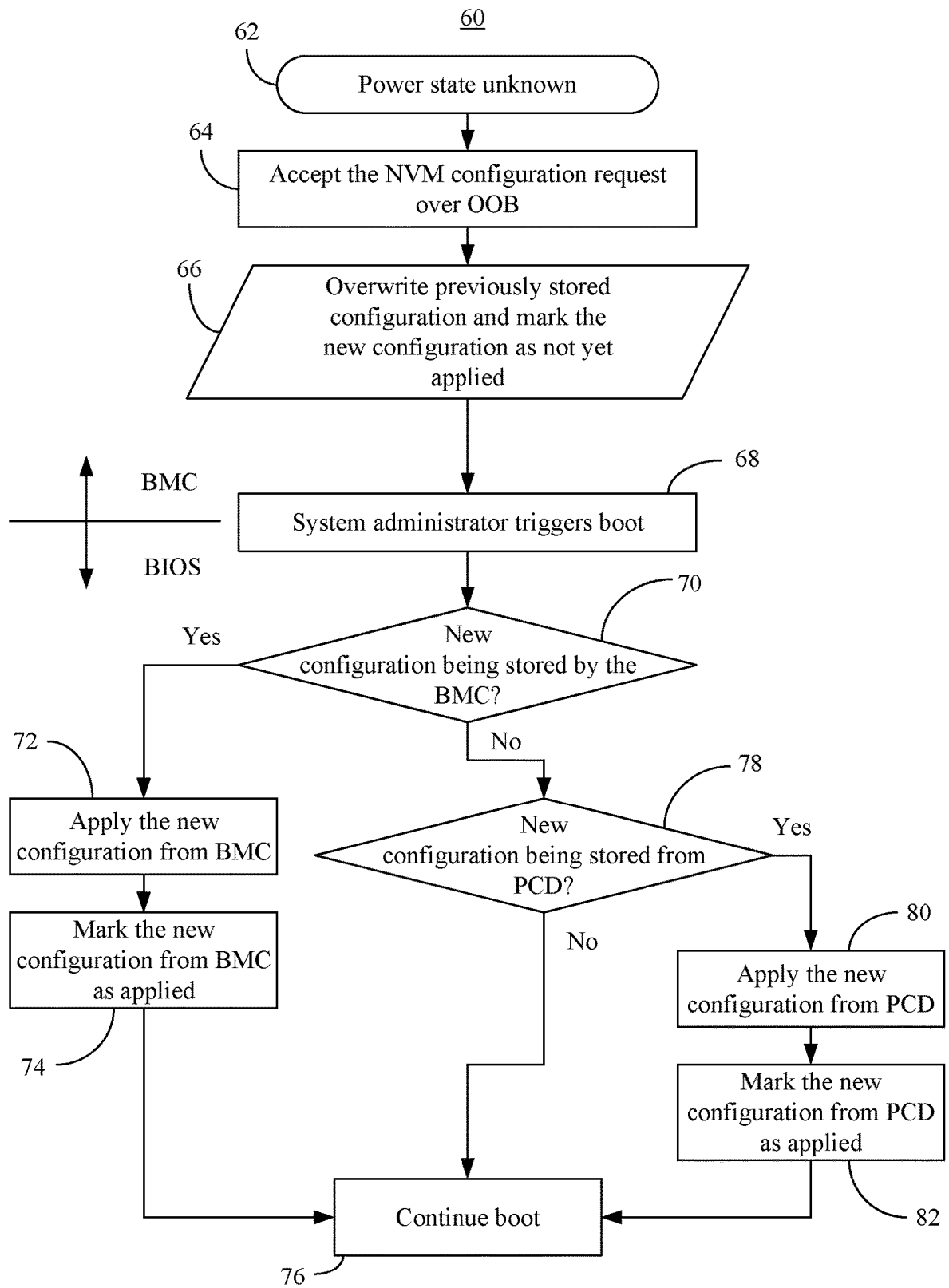
FIG. 3B is a flowchart of an example of a configuration change flow according to an embodiment.

FIG. 3B shows a method 60 of conducting a configuration change. The method 60 may generally be implemented in a BMC and a BIOS of a computing system such as the computing system 10 (FIG. 1), already discussed. More particularly, the method 60 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated BMC block 62 proceeds with the power state of the computing system being unknown and/or disregarded. An NVM configuration request may be accepted over an OOB management interface at BMC block 64. BMC block 66 overwrites a previously stored configuration and marks the new configuration data as not yet applied. If the new configuration is being received while the system is in the S0 state, a reboot of the system may be appropriate. Accordingly, a system administrator may trigger a boot of the computing system at block 68, wherein illustrated BIOS block 70 determines whether a new configuration is being stored by the BMC. If so, BIOS block 72 retrieves and applies the new configuration from the BMC and BIOS block 74 marks the new configuration from the BMC as applied. In an embodiment, the new configuration is also stored in a common location (e.g., platform configuration data/PCD), regardless of the source of the original configuration request. The boot may be continued at BIOS block 76.

If it is determined at BIOS block 70 that there is no new configuration being stored by the BMC, illustrated BIOS block 78 determines whether a new configuration is being stored from PCD. In an embodiment, the PCD contains settings that are established during the time that a platform BIOS/Boot-loader is built. In one example, the PCD can be changed during the S0 state as well (e.g., using an NVM configuring CLI application executed directly on the system). In the case of a UEFI compliant codebase, there may be commonly defined interfaces to abstract certain types of PCDs. If it is determined that the PCD is storing a new configuration, BIOS block 80 applies the new configuration from the PCD, wherein BIOS block 82 may mark the new configuration from the PCD as applied. The illustrated method 60 then continues the boot at BIOS block 76. If it is determined at BIOS block 78 that a new configuration is not being stored by the PCD, the method 60 may bypass BIOS blocks 80 and 82. Thus, a newly stored configuration from the BMC has a higher priority than a configuration stored traditionally in the PCD. The illustrated method 60 therefore enables faster configuration of the NVM by accepting the NVM configuration request irrespectively of whether the computing system is in an operational power state (e.g., S0 ACPI power state).

Figure 4:
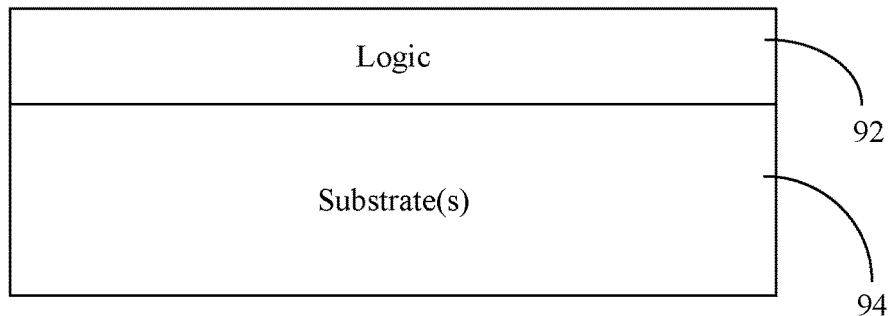
FIG. 4 is an illustration of an example of a semiconductor apparatus according to an embodiment.

FIG. 4 shows a semiconductor package apparatus 90. The illustrated apparatus 90 includes one or more substrates 94 (e.g., silicon, sapphire, gallium arsenide) and logic 92 (e.g., transistor array and other integrated circuit/IC components) coupled to the substrate(s) 94. The logic 92 may be implemented at least partly in configurable logic or fixed-functionality logic hardware. In one example, the logic 92 implements one or more aspects of the method 30 (FIG. 2), the method 40 (FIG. 3A) and/or the method 60 (FIG. 3B), already discussed. Thus, the logic 92 may receive, at a remote access controller of a computing system, configuration data associated with an NVM of the computing system, wherein the configuration data is received while the computing system is in a sleep state. In an embodiment, the configuration data may also be received while the computing system is in any other power state. The logic 92 may also store the configuration data and provide a host processor of the computing system with access to the configuration data. In an embodiment, receipt of the configuration data bypasses a memory configuration-related reboot of the computing system. Additionally, the configuration data may be received via an OOB management interface.

As already noted, receiving the configuration data while the computing system is in the sleep state enables a reboot of the computing system to be avoided. Thus, a system administrator no longer needs to reboot the system to activate the OS on the host processor, log in remotely, and set the proper memory configuration, in the illustrated example. Accordingly, the logic 92 may enhance performance and scalability to the extent that configuring the NVM is faster and more flexible than conventional solutions.

In one example, the logic 92 includes transistor channel regions that are positioned (e.g., embedded) within the substrate(s) 94. Thus, the interface between the logic 92 and the substrate(s) 94 may not be an abrupt junction. The logic 92 may also be considered to include an epitaxial layer that is grown on an initial wafer of the substrate(s) 94.

Figure 5:
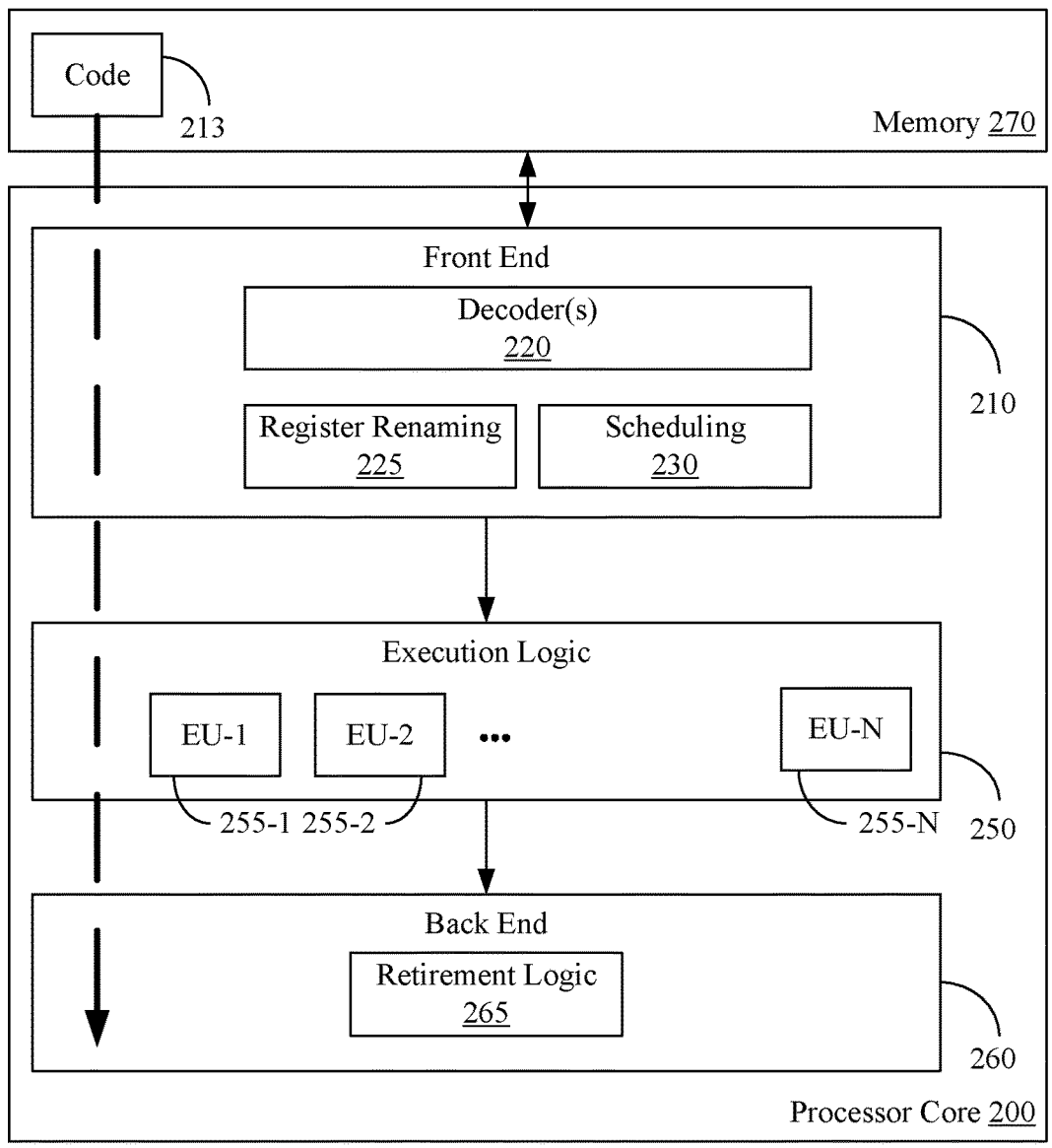
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIG. 2), the method 40 (FIG. 3A) and/or the method 60 (FIG. 3B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
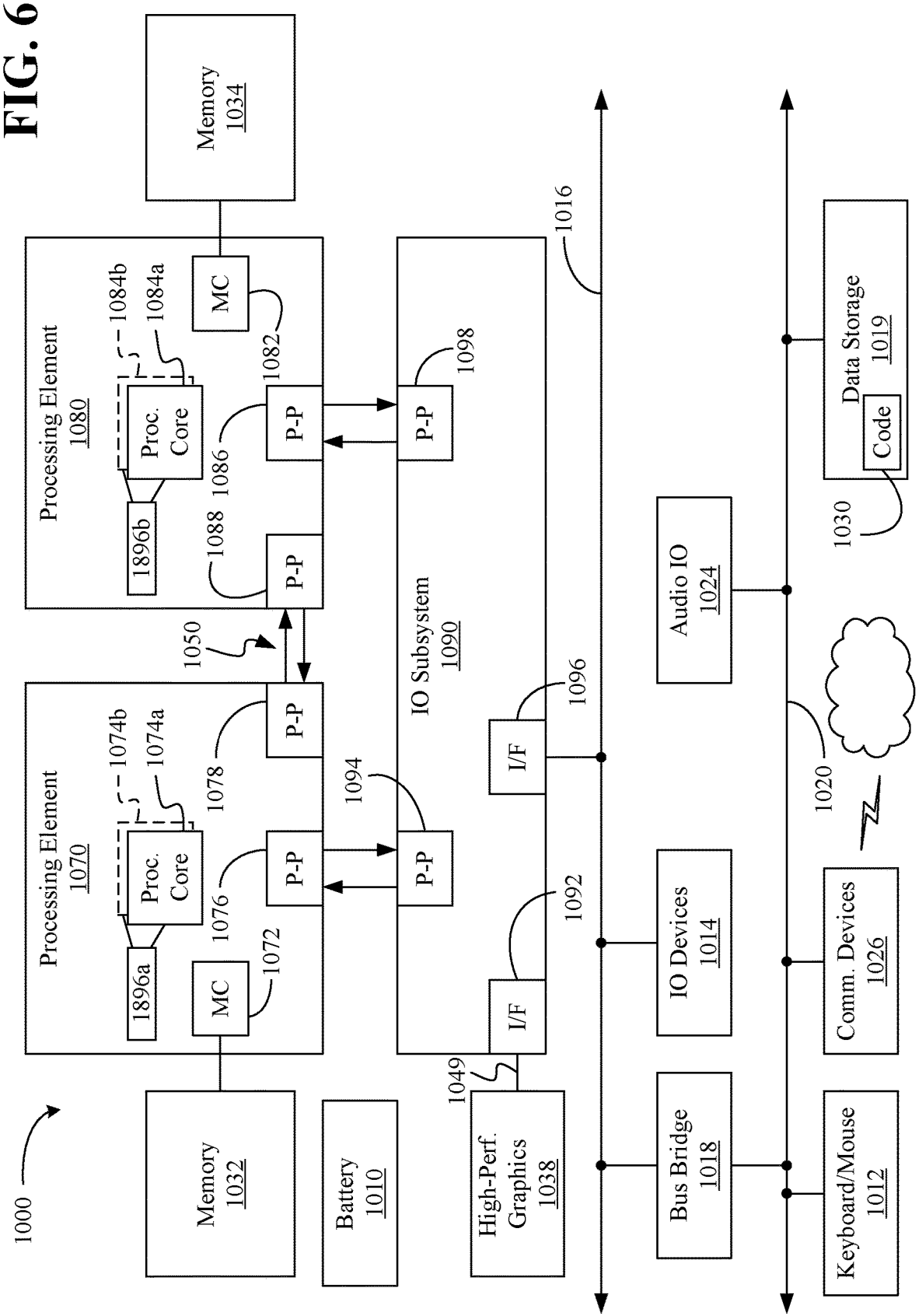
FIG. 6 is a block diagram of an example of a multi-processor based computing system according to an embodiment.

Referring now to FIG. 6, shown is a block diagram of a computing system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 5.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 30 (FIG. 2), the method 40 (FIG. 3A) and/or the method 60 (FIG. 3B), already discussed. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples

Example 1 includes a performance and scalability-enhanced computing system comprising a non-volatile memory, a host processor coupled to the non-volatile memory, and a remote access controller including a computer readable storage medium, wherein the computer readable storage medium includes a set of executable program instructions, which when executed by the remote access controller, cause the remote access controller to receive, at the remote access controller, configuration data associated with the non-volatile memory, wherein the configuration data is to be received while the computing system is in a sleep state, store the configuration data, and provide the host processor with access to the configuration data.

Example 2 includes the computing system of Example 1, wherein receipt of the configuration data at the remote access controller is to bypass a memory configuration-related reboot of the computing system.

Example 3 includes the computing system of Example 1, further including an out-of-band management interface coupled to the remote access controller, wherein the configuration data is to be received via the out-of-band management interface.

Example 4 includes the computing system of Example 1, wherein the executable program instructions, when executed, cause the remote access controller to verify the configuration data.

Example 5 includes the computing system of Example 1, wherein the executable program instructions, when executed, cause the remote access controller to mark the configuration data as not yet applied.

Example 6 includes the computing system of Example 1, wherein the access is to be provided to a basic input output system (BIOS) executing on the host processor, and wherein the BIOS is to retrieve the configuration data, apply the configuration data to the non-volatile memory and mark the configuration data as applied.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to receive, at a remote access controller of a computing system, configuration data associated with a non-volatile memory of the computing system, wherein the configuration data is to be received while the computing system is in a sleep state, store the configuration data, and provide a host processor of the computing system with access to the configuration data.

Example 8 includes the semiconductor apparatus of Example 7, wherein receipt of the configuration data at the remote access controller is to bypass a memory configuration-related reboot of the computing system.

Example 9 includes the semiconductor apparatus of Example 7, wherein the configuration data is to be received via an out-of-band management interface.

Example 10 includes the semiconductor apparatus of Example 7, wherein the logic coupled to the one or more substrates is to verify the configuration data.

Example 11 includes the semiconductor apparatus of Example 7, wherein the logic coupled to the one or more substrates is to mark the configuration data as not yet applied.

Example 12 includes the semiconductor apparatus of Example 7, wherein the access is to be provided to a basic input output system (BIOS) executing on the host processor.

Example 13 includes the semiconductor apparatus of Example 7, wherein the logic coupled to the one or more substrates includes transistor channel regions that are positioned within the one or more substrates.

Example 14 includes at least one computer readable storage medium comprising a set of executable program instructions, which when executed by a remote access controller of a computing system, cause the computing system to receive, at the remote access controller, configuration data associated with a non-volatile memory of the computing system, wherein the configuration data is to be received while the computing system is in a sleep state, store the configuration data, and provide a host processor of the computing system with access to the configuration data.

Example 15 includes the at least one computer readable storage medium of Example 14, wherein receipt of the configuration data at the remote access controller is to bypass a memory configuration-related reboot of the computing system.

Example 16 includes the at least one computer readable storage medium of Example 14, wherein the configuration data is to be received via an out-of-band management interface.

Example 17 includes the at least one computer readable storage medium of Example 14, wherein the executable program instructions, when executed by the remote access controller, cause the computing system to verify the configuration data.

Example 18 includes the at least one computer readable storage medium of Example 14, wherein the executable program instructions, when executed by the remote access controller, cause the computing system to mark the configuration data as not yet applied.

Example 19 includes the at least one computer readable storage medium of Example 14, wherein the access is to be provided to a basic input output system (BIOS) executing on the host processor.

Example 20 includes a method comprising receiving, at a remote access controller of a computing system, configuration data associated with a non-volatile memory of the computing system, wherein the configuration data is received while the computing system is in a sleep state, storing the configuration data, and providing a host processor of the computing system with access to the configuration data.

Example 21 includes the method of Example 20, wherein receipt of the configuration data at the remote access controller bypasses a memory configuration-related reboot of the computing system.

Example 22 includes the method of Example 20, wherein the configuration data is received via an out-of-band management interface.

Example 23 includes the method of Example 20, further including verifying the configuration data.

Example 24 includes the method of Example 20, further including marking the configuration data as not yet applied.

Example 25 includes the method of Example 20, wherein the access is provided to a basic input output system (BIOS) executing on the host processor.

Thus, technology described herein may fill a gap in currently supported NVM configurations by extending the configuration capabilities to include a new OOB interface that is available in all Sx host power states. Such a solution simplifies and speeds up the platform configuration procedure and gives the platform administrator flexibility in remote configuration changes/adjustments (e.g., in the case of system crashes during the BIOS boot).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a non-volatile memory;
   a host processor coupled to the non-volatile memory;
   an out-of-band management interface; and
   a remote access controller, in communication with the out-of-band management interface and the host processor, including a computer readable storage medium, wherein the computer readable storage medium includes a set of executable program instructions, which when executed by the remote access controller, cause the remote access controller to:
     receive, at the remote access controller via the out-of-band management interface, configuration data associated with the non-volatile memory, wherein the configuration data is to be received and accepted while the computing system and the host processor are in any power state including a sleep state after a mechanical off state,
     verifying that the configuration data is supported by a target run-time environment,
     store the configuration data,
     mark the configuration data as not yet applied, and
     provide the host processor with access to the configuration data, wherein receipt of the configuration data at the remote access controller is to bypass a memory configuration-related reboot of the computing system.

2. The computing system of claim 1, wherein the access is to be provided to a basic input output system (BIOS) executing on the host processor, and wherein the BIOS is to retrieve the configuration data, apply the configuration data to the non-volatile memory and mark the configuration data as applied.

3. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates to:
     receive, at a remote access controller of a computing system via an out-of-band management interface, configuration data associated with a non-volatile memory of the computing system, wherein the configuration data is to be received and accepted while the computing system is in any power state including a sleep state after a mechanical off state;
     verify that the configuration data is supported by a target run-time environment;
     store the configuration data;
     mark the configuration data as not yet applied; and
     provide a host processor of the computing system with access to the configuration data, wherein receipt of the configuration data at the remote access controller is to bypass a memory configuration-related reboot of the computing system.

4. The semiconductor apparatus of claim 3, wherein the access is to be provided to a basic input output system (BIOS) executing on the host processor.

5. The semiconductor apparatus of claim 3, wherein the logic coupled to the one or more substrates includes transistor channel regions that are positioned within the one or more substrates.

6. At least one non-transitory computer readable storage medium comprising a set of executable program instructions, which when executed by a remote access controller of a computing system, cause the computing system to:
   receive, at the remote access controller via an out-of-band management interface, configuration data associated with a non-volatile memory of the computing system, wherein the configuration data is to be received and accepted while the computing system is in any power state including a sleep state after a mechanical off state;
   verifying that the configuration data is supported by a target run-time environment;
   store the configuration data;
   mark the configuration data as not yet applied; and
   provide a host processor of the computing system with access to the configuration data,
   wherein receipt of the configuration data at the remote access controller is to bypass a memory configuration-related reboot of the computing system.

7. The at least one non-transitory computer readable storage medium of claim 6, wherein the access is to be provided to a basic input output system (BIOS) executing on the host processor.

8. A method comprising:
   receiving, at a remote access controller of a computing system via an out-of-band management interface, configuration data associated with a non-volatile memory of the computing system, wherein the configuration data is received and accepted while the computing system is in any power state including a sleep state after a mechanical off state;
   verifying that the configuration data is supported by a target run-time environment;
   storing the configuration data;
   marking the configuration data as not yet applied; and
   providing a host processor of the computing system with access to the configuration data, wherein receipt of the configuration data at the remote access controller bypasses a memory configuration-related reboot of the computing system.

9. The method of claim 8, wherein the access is provided to a basic input output system (BIOS) executing on the host processor.

* * * * *